US008870635B2

(12) United States Patent
Töpfer (10) Patent No.: US 8,870,635 B2
(45) Date of Patent: Oct. 28, 2014

(54) CLIPPING MACHINE WITH PIVOTABLE FILLING TUBE AND PIVOTABLY GUIDED CASING BRAKE

(71) Applicant: Poly-clip System GmbH & Co. KG, Hattersheim (DE)

(72) Inventor: Klaus Töpfer, Büttelborn (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/183,067

(22) Filed: Feb. 18, 2014

(65) Prior Publication Data

US 2014/0235151 A1    Aug. 21, 2014

(30) Foreign Application Priority Data

Feb. 19, 2013   (EP) ...................................... 13155763

(51) Int. Cl.
*A22C 11/00*   (2006.01)
*A22C 11/02*   (2006.01)

(52) U.S. Cl.
CPC ...................................... *A22C 11/02* (2013.01)
USPC .......................................................... 452/45

(58) Field of Classification Search
USPC ................. 452/21–26, 30–35, 37, 45–48, 51; 53/576, 550, 567; 141/114, 252, 269, 141/284, 314, 368
See application file for complete search history.

(56) References Cited

U.S. PATENT DOCUMENTS

| 4,837,896 A * | 6/1989 | Lockard ........................... 452/38 |
| 6,139,416 A * | 10/2000 | Topfer ............................. 452/31 |
| 8,137,167 B2 * | 3/2012 | Baechtle et al. ................ 452/36 |
| 8,376,002 B2 * | 2/2013 | Jens ................................ 141/284 |
| 8,715,043 B2 * | 5/2014 | Sames ............................. 452/35 |
| 8,740,676 B2 * | 6/2014 | Ebert ............................... 452/35 |
| 2010/0233949 A1 * | 9/2010 | Maile et al. ..................... 452/35 |
| 2014/0127985 A1 * | 5/2014 | Ebert ............................... 452/35 |

FOREIGN PATENT DOCUMENTS

| DE | 202009013062 U1 | 3/2011 |
| EP | 1588621 A1 | 10/2005 |
| WO | 2011038885 A1 | 4/2011 |

* cited by examiner

*Primary Examiner* — Richard Price, Jr.
(74) *Attorney, Agent, or Firm* — Hahn Loeser & Parks LLP (57) ABSTRACT

A filling tube assembly for being mounted to a clipping machine for producing sausage-shaped products. The filling tube assembly comprises a mounting unit for mounting the filling tube assembly to the clipping machine and a filling tube for feeding flowable filling material into the packaging casing. The packaging casing is being consumably arranged on the filling tube. The filling tube is pivotable relative to the mounting unit at least between a production position and an interchanging position. The filling tube assembly further comprises a casing brake unit, a casing brake holder and a casing brake for being reversibly coupled to the casing brake holder. The casing brake is moveable between a braking position and a releasing position by a pivoting and translational action. In the releasing position, the casing brake is pivoted away from the filling tube, so that unfilled packaging casing can be loaded onto the filling tube.

24 Claims, 5 Drawing Sheets

CLIPPING MACHINE WITH PIVOTABLE FILLING TUBE AND PIVOTABLY GUIDED CASING BRAKE

This application claims priority to, and the benefit of, European Patent Application No. 13 155 763.9-1655 filed Feb. 19, 2013 with the European Patent Office, which is hereby incorporated by reference.

BACKGROUND OF THE INVENTION

The present invention refers to a filling tube assembly for being mounted to a clipping machine for producing sausage-shaped products, like sausages, by feeding flowable filling material, in a filling process, into a tubular or bag-shaped packaging casing. The filling tube assembly comprises a mounting unit for mounting the filling tube assembly to the clipping machine and a filling tube for feeding flowable filling material in a feeding direction into a tubular or bag-shaped packaging casing. The packaging casing is being consumably arranged on the filling tube. The filling tube has a filling inlet for receiving the filling material, a filling outlet for discharging the filling material into the packaging casing and a filling tube axis, extending between the filling inlet and the filling outlet. The filling tube is pivotable relative to the mounting unit around a pivot axis at least between a production position and an interchanging position. The filling tube assembly further comprises a casing brake unit with a brake axis, a casing brake holder and a casing brake for being reversibly coupled to the casing brake holder. The casing brake holder is configured for reversibly holding the casing brake on the filling tube in a braking position, in which the brake axis is at least basically coaxial with the filling tube axis. The casing brake holder together with the casing brake is moveable between the braking position and a releasing position by a pivoting and translational action. In the releasing position, the casing brake holder together with the casing brake is pivoted away from the filling tube in a way that unfilled packaging casing can be loaded onto the filling tube.

In practice, it is known that, e.g. in the production of sausage-shaped products, like sausages, paste-like, granular and/or liquid material is fed by a filling machine with a filling pressure through a filling tube of a clipping machine in a feeding direction into a tubular or bag-shaped packaging casing. The packaging casing is stored on the filling tube and closed at its front end, e.g. the end pointing in or downstream the feeding direction, by a closure means, like a closure clip. During the filling process, the packaging casing is filled with the filling material and pulled-off the filling tube by the filling pressure. For preventing the tubular or bag-shaped packaging casing from uncontrolled sliding-off the filling tube, a casing brake unit with a casing brake is provided, wherein the casing brake is detachably arranged on the filling tube and kept in position by a casing brake holder. The casing brake is configured for providing a frictional force to the packaging casing, at least while the packaging casing is being pulled-off the filling tube during the filling process, thus controlling the pull-off speed of the packaging casing from the filling tube and ensuring an approximately constant filling degree. After a predetermined volume of filling material has been filled into the packaging casing, a displacer unit forms a plait-like portion to an open end of the just filled packaging casing that is pointing against or upstream the feeding direction. The displacer unit usually comprises a first and a second displacer member which can each be formed by a pair of mutually movable displacement elements for compressing the filled packaging casing, thereby displacing the filling material from the respective area and mutually moving away in or against the feeding direction, hence forming the plait-like portion of the tubular packaging casing. Subsequently, the bag end is being closed by a clipping unit with respective closing tools which are reversibly movable towards the plait-like portion of the clipping machine by placing and closing at least one closure clip at the plait-like portion of the packaging casing, thus forming the rear end of the sausage-shaped product, namely the end pointing against or upstream the feeding direction. As well as the rear end, by these means a new closed front end for a succeeding sausage-shaped product is provided. Optionally, in a final step, the sausage-shaped product that just has been closed at its rear end is cut-off the packaging casing that is provided on the filling tube and has not been filled yet by a cutting unit.

For providing the tubular packaging casing on the filling tube, there are basically two methods available.

According to a first method, an axially compressed batch of packaging casing that has already a tubular shape is provided on the filling tube by being imposed onto the filling tube from its delivery end, e.g. the end of the filling tube facing in the feeding direction of the filling material and having a filling outlet. Therefore, the operator needs an easy access to the filling tube, wherein usually at least the casing brake has to be removed from the filling tube. The advantage of this configuration is that it requires less space and the production speed is only dependent on the speed of the filling, displacement, closing and the optional cutting process. A disadvantage of the second method is that, in case the packaging casing provided on the filling tube is consumed, a new batch of tubular packaging casing has to be loaded onto the filling tube from its delivery end. For this loading process, the casing brake has to be removed from the filling tube for getting access to the open end of the filling tube. In some types of clipping machines, the displacer arrangement, clipping unit and cutting unit are arranged so closely to the delivery end of the filling tube that they have to be removed as well. In other configurations, the filling tube is pivotable relative to the machine base for getting better access to the filling outlet side of the filling tube. This process is usually very time-consuming and requires a great amount of skill and experience of the operator. Consequently, this process will cause unwanted production down-time.

Furthermore, the diameter of the sausage-shaped product to be produced defines the outer diameter of the filling tube and the inner diameter of the casing brake, respectively. Therefore, in order to produce sausage-shaped products of different diameters, different filling tubes with corresponding outer diameters and casing brakes with corresponding inner diameters have to be used. Accordingly, for switching production to sausage-shaped products that have a diameter different from the previously produced sausage-shaped products, at least the previously used filling tube has to be replaced by a suitable filling tube having a compatible diameter to the sausage-shaped products to be produced. In addition, either the previously used casing brake is not compatible with the suitable filling tube and has to be replaced by a suitable casing brake or the previously used casing brake has an adjustable inner diameter that can be fitted to the selected filling tube, respectively.

Moreover, the inner parts of the casing brake, that are in contact with the outer surface of the tubular packaging casing are usually made of comparatively soft material, e.g. rubber and are subject to permanent friction with the packaging casing. Therefore, casing brakes generally suffer stronger wear-out than other components of the clipping machine, e.g. the filling tube, displacer unit or clipping unit. Worn-out casing brakes can lead to machine failure, e.g. by damaging the packaging casing or providing insufficient friction to the packaging casing which will lead to an increased amount of packaging casing being pulled-off the filling tube per product produced. A damaged packaging casing can result in a bursting of the packaging casing during the filling process and thereby spreading the filling material inside and/or outside the clipping machine, thus the clipping machine can be contaminated or even damaged and as a consequence production has to be stopped. Even if the packaging casing does not burst, the product is at least likely to be faulty. Therefore, it is necessary to replace the casing brake of a clipping machine after a certain usage, e.g. time of usage or total length of processed packaging casing.

A second method for providing the tubular packaging casing on the filling tube is used in some types of known clipping machines, wherein the casing brake is provided at the clipping unit of the clipping machine, and wherein the clipping unit and displacer unit are pivotable arranged at the clipping machine. In these known clipping machines, the end of the filling tube that is opposite the filling outlet is pivotably arranged at the clipping machine. Consequently, the filling tube, clipping unit and displacer unit can pivot relatively to the clipping machine around different pivot-axes, wherein clipping unit and displacer unit are usually pivotable around the same pivot-axis. For replacing the filling tube and/or feeding packaging casing to the filling tube, the clipping unit with the displacer unit and casing brake has to be pivoted, thus removing the casing brake from the filling tube. Subsequently, the filling tube can be pivoted away from the clipping machine to a suitable position for replacing the filling tube and/or feeding packaging casing to the filling tube. This procedure is generally complicated and requires several operations to be performed by a skilled operator subsequently.

In another type of known clipping machines, the clipping unit and displacer unit are fixedly attached to the clipping machine. The filling tube is pivotably arranged at the clipping machine. The pivot axis of the filling tube is arranged upstream the filling tube with respect to the feeding direction. The casing brake holder comprises a guide rail for holding the casing brake on the filling tube when the filling tube is not pivoted away from the clipping machine. The guide rail of the casing brake holder is usually shaped like a fork, comprising at least two teeth, wherein the casing brake is interposed in between the two teeth, when the casing brake holder is arranged on the filling tube and the filling tube is not pivoted away from the clipping machine. Consequently, the casing brake holder is configured for releasing the casing brake when the filling tube with the casing brake still mounted is pivoted away from the clipping machine. Once the filling tube is pivoted away from the clipping machine to a degree that the casing brake is moved out of the guide rail of the casing brake holder, the casing brake can be removed from the filling tube in direction of the filling tube axis. This whole process, especially the mounting process of the casing brake onto the filling tube and the engaging process of the casing brake with the casing brake holder while pivoting the filling tube back towards the clipping machine, is very cumbersome as well as time consuming and requires a skilled operator.

One solution for arranging a casing brake at a clipping machine for being removably attached to a filling tube is disclosed in DE utility model 20 2009 013 062. The casing brake holder is attached to a wheeled crab that is guided on an S-shaped rail. The rail is fixedly attached to the clipping machine. The filling tube is pivotably attached to the clipping machine as well. By pivoting the filling tube together with the casing brake away from the clipping machine, the crab is forced along the rail, thereby pulling the casing brake off the filling tube. For reassembling the casing brake back onto the clipping machine after the new tubular packaging casing has been imposed onto the filling tube, the casing brake has to be pushed back onto the filling tube and will be forced back to the braking position by the crab when the filling tube is pivoted back to the production position. This system holds the disadvantage that due to the pivoting action of the filling tube, radial oriented forces are introduced from the filling tube to the casing brake. Moreover, due to the axial movement of the casing brake with respect to the filling tube in combination with the radial oriented forces, the casing brake is subject to increased strain. Consequently, since the casing brake is usually made of relatively soft material, like rubber or silicone, the pivoting procedure can cause damages to the casing brake. Furthermore, especially the process of rearranging the casing brake onto the filling tube is inconvenient because the casing brake and the filling tube have to be aligned manually.

SUMMARY OF THE INVENTION

It is therefore an object of the present invention to provide a filling tube assembly for being mounted to a clipping machine and a clipping machine itself that allow an easier and faster access to the filling tube for replacement of the packaging casing and/or for replacement of the filling tube and the casing brake, thus reducing workload and complexity for the operator of the clipping machine, avoiding damages as well as wear out of the casing brake and minimizing production-down time.

This object is achieved by a filling tube assembly for being mounted to a clipping machine for producing sausage-shaped products, like sausages, by feeding flowable filling material, in a filling process, into a tubular or bag-shaped packaging casing. The filling tube assembly comprises a mounting unit for mounting the filling tube assembly to the clipping machine and a filling tube for feeding flowable filling material in a feeding direction into a tubular or bag-shaped packaging casing. The packaging casing is being consumably arranged on the filling tube. The filling tube has a filling inlet for receiving the filling material, a filling outlet for discharging the filling material into the packaging casing and a filling tube axis, extending between the filling inlet and the filling outlet. The filling tube is pivotable relative to the mounting unit around a pivot axis at least between a production position and an interchanging position. The filling tube assembly further comprises a casing brake unit with a brake axis, a casing brake holder and a casing brake for being reversibly coupled to the casing brake holder. The casing brake holder is configured for reversibly holding the casing brake on the filling tube in a braking position, in which the brake axis is at least basically coaxial with the filling tube axis. When the casing brake is in the braking position, the filling tube is preferably in the production position. The casing brake holder together with the casing brake is moveable between the braking position and a releasing position by a pivoting and translational action. In the releasing position, the casing brake holder together with the casing brake is pivoted away from the filling tube in a way that unfilled packaging casing can be loaded onto the filling tube. Then, the filling tube is preferably in the interchanging position.

Furthermore, the casing brake unit comprises a first holding device with a first holding axis. The first holding device is coupled to the filling tube in a way that a pivoting action of the filling tube around the pivot axis causes the same pivoting action of the first holding device around the pivot axis. The casing brake holder is pivotably arrangable at the first holding device for pivoting relatively to the first holding device at least in a section between the braking position and the releasing position. The casing brake holder is movable along the first holding axis. The casing brake unit further comprises a second holding device for guiding the casing brake holder with the casing brake along at least two guiding means. The casing brake holder and/or the casing brake comprise at least one corresponding engaging means for each guiding means for engaging with a respective guiding means. The guiding means are configured for causing a translational movement of the casing brake relative to the filling tube when moved between the braking position and a turning position and for causing a pivoting action of the casing brake relative to the filling tube when moved between the turning position and the release position, when the filling tube is pivoted between the production position and the interchanging position. By these means, a pivoting action of the filling tube from the production position to the interchanging position causes a similar pivoting action of the first holding device, thereby moving the casing brake holder with the casing brake along a predetermined path of the second holding device. As a result, the position and orientation of the casing brake and the casing brake holder is dependent on the pivoting position of the filling tube. In other words, the casing brake and the casing brake holder are restricted guided with respect to the pivoting action of the filling tube.

Preferably, the construction is designed in a way that the main forces for actuating the pivoting action of the first holding device are not introduced from the filling tube though the casing brake to the first holding device. Further preferably, the guiding means are configured such that, in the production position of the filling tube, the casing brake is in braking position, and in interchanging position of the filling tube, the casing brake is in releasing position.

According to the invention, the first holding device and the second holding device are configured such that, during the pivoting action of the filling tube from the production position to the interchanging position, the casing brake is firstly moved along the filling tube axis from the braking position to a position adjacent to the filling outlet and preferably off the filling tube or at least close to the respective end of the filling tube and subsequently being pivoted away from the filling tube axis. Preferably, the direction of the pivoting action of the casing brake away from the filling tube axis is opposite the pivoting action of the filling tube. When pivoting the filling tube back from the interchanging position to the production position, the whole procedure is reversed.

In a preferred embodiment of the invention, the guiding means is configured such that, during the movement of the filling tube from the production position to the interchanging position, the casing brake is forced from the braking position to the releasing position. Thereby, the casing brake is first being moved axially along the filling tube axis towards the filling outlet and subsequently, after being moved off the filling tube, being pivoted away from the filling tube axis. This configuration is directed to minimizing the stress imposed on the casing brake during the removal and reassembly procedure.

Preferably, the guiding means comprise at least a channel with side-walls, wherein the engaging means comprise at least a protruding member, like a pin with a circular cross-section or a cross-section of a segment of a circle, for protruding inside the channel and for engaging with at least one side-wall of the channel. Alternatively or additionally, the guiding means comprises a rail, wherein the engaging means comprises at least a crab with wheels and/or sliding means for engaging with the rail.

It is preferred that, at least in one segment of the moving path, the guiding means are diverging with respect to the pivoting direction of the filling tube. Preferably, the guiding means are diverging with respect to the pivoting direction of the filling tube from the production position to the interchanging position. Alternatively, the guiding means could be converging with respect to the pivoting direction of the filling tube from the production position to the interchanging position. The direction and degree of the pivoting action of the casing brake with respect to the pivoting action of the filling tube is dependent on the diverging or converging of the guiding means in cooperation with the position of the engagement means with respect to the casing brake.

According to a preferred embodiment of the invention, the first holding device comprises at least a first elongate beam and a second elongate beam extending along the first holding axis and being engaged with each other, preferably in a telescopic way. The first elongate beam and the second elongate beam are configured for being mutually shifted along the first holding axis. The mutual shifting action of the first elongate beam and the second elongate beam can be actuated by the casing brake when the filling tube is pivoted between production position and interchanging position.

It is preferred that either at least a part of the first elongate beam is encompassed by at least a part of the second elongate beam or that at least a part of the second elongate beam is encompassed by at least a part of the first elongate beam. The first elongate beam and the second elongate beam can comprise corresponding cross-sections, e.g. round, oval, rectangular or quadratic.

Preferably, the first elongate beam has a first beam axis and the second elongate beam has a second beam axis, wherein the first beam axis and second beam axis are mutually parallel. This configuration has the advantage, that the length of the first holding device can be varied easily when the filling tube and holding device are pivoted and thereby forcing the casing brake along the guiding means.

Advantageously, the first elongate beam is fixed to the filling tube and the casing brake holder is pivotably fixed to the second elongate beam.

It is preferred that the filling tube is fixedly and reversibly mounted to an adapter part of a fixation unit. The first holding device is fixedly mounted to the adapter part of the fixation unit well. Alternatively, the first holding device could be mounted to the filling tube directly, preferably at a location on the outside of the filling tube within the proximity of the filling inlet. The adapter part is pivotably arranged at a guiding part of the fixation unit for enabling the pivoting action of the filling tube and the casing brake unit relatively to the mounting unit of the filling tube assembly around the pivot axis.

In a preferred embodiment of the invention, the adapter part comprises a calotte-shaped adapter and the guiding part comprises a calotte holder. At least a part of the calotte-shaped adapter is pivotably arranged inside the calotte holder and the calotte holder is fixed to or an integral part of the mounting unit. The advantage of calotte-shaped parts at the pivot axis is that the fixation unit can be clogged in a way that it remains clogged when the filling tube is pivoted between the production position and the interchanging position. Hence, leakage of filling material from the fixation unit into the environment of the filling tube can be avoided.

Preferably, the second holding device is linearly movable relative to the mounting unit on an adjustment path in feeding direction and against feeding direction. Preferably the second holding device is fixable in at least two positions on the adjustment path for being adaptable to different filling tube lengths.

Advantageously, the linear moving action of the second holding device is actuated by at least one drive means. Since the casing brake is restricted guided and the position as well as the orientation of the casing brake is distinct, dependent on the pivoting angle of the filling tube, the process of driving filling tube between production position and interchanging position as well as the dependent process of driving and orientating the casing brake between braking position and releasing position, can be executed automatically by drive means.

It is preferred that the drive means comprises a cylinder piston that is preferably operated pneumatically. Such cylinder piston drive means has the advantage of producing comparatively low contamination to the area of operation compared with other known drive means.

In a preferred embodiment of the invention, the second holding device comprises at least four guiding means. Each of the guiding means is facing opposite a corresponding guiding means for providing the same guidance for the casing brake. The casing brake is arranged in between two pairs of corresponding guiding means. The advantage of this configuration is that the restricted guidance of the casing brake is improved, because moments of tilt of the casing brake are cancelled be a respective guiding Furthermore, this makes the filling tube assembly more robust and reduces the risk of machine failure.

Moreover, the above mentioned object is solved by a clipping machine for producing sausage-shaped products, like sausages, by feeding flowable filling material, in a filling process, into a tubular or bag-shaped packaging casing in a feeding direction, wherein the clipping machine comprises a filling tube assembly according to any of claims 1 to 14.

The advantage of a filling tube assembly and a clipping machine according to the invention compared to the devices known from the state on the art is that for removing the casing brake from the filling tube, the clipping unit, displacer unit and cutting device do not have to be moved aside and can be fixedly attached to the clipping machine. Therefore, a device according to the present invention is characterized by a compact structure. Moreover, the refilling process of packaging casing material onto the filling tube is significantly improved because for getting access to the free end of the filling tube only the filling tube has to be pivoted by the operator. No alignment procedure of the casing brake and the filling tube is necessary. The whole removing process of the casing brake from the filling tube and the subsequent remounting process of the casing brake can be executed by the operator one handed and does not require special technical skills. Moreover, since no radial forces are transmitted between the filling tube and the casing brake with respect to filling tube axis, the lifetime of the casing brake is not negatively affected.

Further advantageous and preferred embodiments of a filling tube assembly and a clipping machine will be described in the following together with the drawings listed below. The expressions "left", "right", "below" and "above" used in the following description, are referred to drawings in an alignment such that the reference numbers and the notations of the figures used can be read in normal orientation. In the drawings:

DETAILED DESCRIPTION OF THE INVENTION

Figure 1:
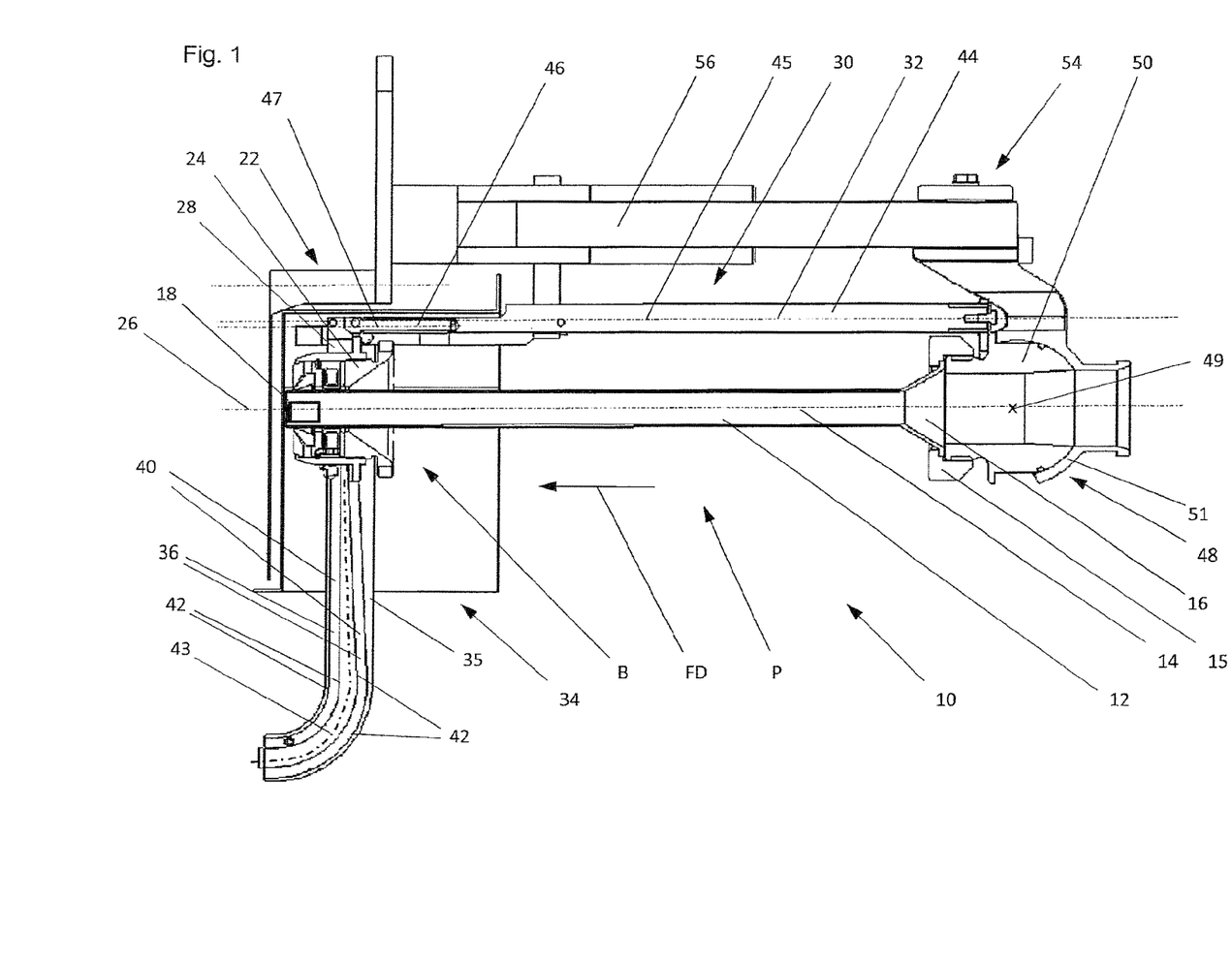
FIG. 1 is a cross-sectional top view of the filling tube assembly according to the invention through the central axis of the filling tube, wherein the filling tube is in the production position and the casing brake is in the braking position.
Figure 2:
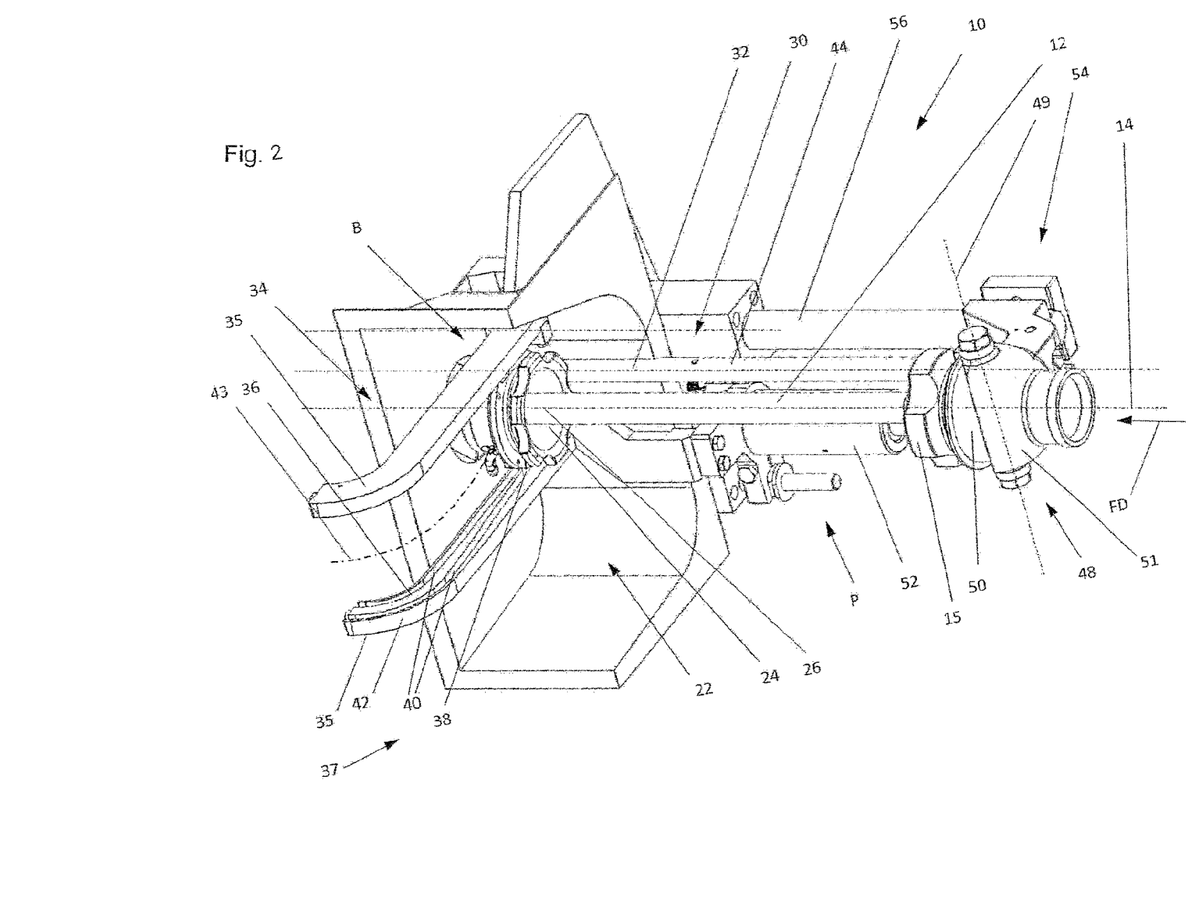
FIG. 2 is a perspective view of the filling tube assembly of FIG. 1, wherein the filling tube is in the production position and the casing brake is in the braking position.

Referring to FIG. 1 and FIG. 2, the filling tube assembly 10 comprises a mounting unit 54, a filling tube 12 and a casing brake unit 22. Filling tube 12 has a longitudinal filling tube axis 14, a filling inlet 16 and a filling outlet 18. Filling inlet 16 is arranged at the end of filling tube 12 that is facing against feeding direction FD. Filling inlet 16 has a tapered shape with decreasing diameters with respect to feeding direction FD. Filling outlet 18 is arranged on the other end of filling tube 12, namely on the end that is facing in feeding direction FD. Filling tube 12 is reversibly fixed with its filling inlet 16 end to a calotte-shaped adapter 50 by means of a cap nut 15. Cap nut 15 in encompassing filling tube 12 and screwed onto calotte-shaped adapter 50. Preferably but not illustrated, a gasket ring for clogging the connection of calotte-shaped adapter 50 and filling tube 12 is provided at between the respective face sides of filling tube 12 and calotte-shaped adapter 50. Calotte-shaped adapter 50 is pivotably arranged at a calotte holder 51 about a pivot axis 49. With respect to the perspective of FIG. 1, pivot axis 49 is vertical to the plane of projection. Calotte-shaped adapter 50, calotte holder 51 and cap nut 15 constitute a fixation unit 48 for pivotably fixing filling tube 12 and a first holding device 30 to mounting unit 54. Mounting unit 54 is provided for reversibly fixing filling tube assembly 10 to a mounting tube 56 of a not shown clipping machine. In the illustrated embodiment, calotte holder 51 is an integral part with mounting unit 54.

Casing brake unit 22 comprises first holding device 30, a second holding device 34, casing brake 24 and casing brake holder 28.

First holding device 30 comprises a first holding axis 32, a first elongate beam 44 with a first beam axis 45 and a second elongate beam 46 with a second beam axis 47. First holding device 30 is reversibly fixed to a side section of calotte-shaped adapter 50, wherein first holding axis 32 and first beam axis 45 are parallel to filling tube axis 14. Second elongate beam 46 is slidably arranged at first elongate beam 44 in a direction of first holding axis 32. In the illustrated embodiment of the invention, a section of second elongate beam 46 is inserted into a longitudinal bore of first elongate beam 44. Alternatively, second elongate beam 46 could be guided within a longitudinal rim or similar guiding means of first elongated beam 44.

On an end section of filling tube 12 that is close to filling outlet 18, casing brake 24 with a brake axis 26 is arranged for providing a frictional force to the outer surface of not illustrated packaging casing, at least while the packaging casing is being pulled-off the filling tube during the filling process. Thus casing brake 24 is configured for controlling the pull-off speed of the packaging casing from the filling tube and insuring an approximately constant filling degree. Casing brake 24 is reversibly attached to casing brake holder 28, e.g. by means of a screw thread, bayonet nut connector or holding rail. In the illustrated embodiment, casing brake holder 28 is pivotable about an axis parallel to pivot axis 49 connected to an end section of second elongate beam 46 that is facing away from first elongate beam 44. Consequently, casing brake 24 is arranged at first holding device 30 pivotable and linearly moveable relative to filling tube 12.

As can be seen best in FIG. 2, second holding device 34 together with casing brake unit 22 is carried by mounting tube 56. Approximately parallel to and vertically below mounting tube 56, a drive unit 52 is arranged. By means of drive unit 52, holding device 34 together with casing brake 24 may be shifted along mounting tube 56 reversibly along filling tube 10, e.g. during the filling process in order to adjust a frictional force to the packaging casing just being filled, or to adjust an inner pressure in the filled packaging casing section during gathering and closing said filled packaging casing section. Drive unit 52 may include any suitable drive elements, like a piston-cylinder drive or an electric drive motor. Second holding device 34 comprises two second holding profiles 35. Each holding profile 35 has a guiding means 36, wherein in this embodiment, guiding means 36 comprises two adjacent channels 40 with side walls 42, extending side by side along the long side of respective second holding profile 35. Second holding device 34 further comprises engaging means 37 for engaging with guiding means 36 and consequently constituting a restricted guidance. In the illustrated embodiment, engaging means 37 comprise four guiding pins 38 with a circular cross-section. Each guiding pin 38 is protruding with one end into a different channel 40 and fixed with the other end to the casing brake holder 28. The diameter of each guiding pin 38 is slightly smaller than the width of respective channel 40 for ensuring good guidance and smooth gliding of each pin 38 within the limits of the side walls 42 of the respective channel 40. Casing brake holder 28 is arranged in between and moveable on a moving path 43 along the long sides of the two second holding profiles 35. As a result of the restricted guidance of casing brake holder 28 due to the engagement of pins 38 with channels 40, at each point along moving path 43, casing brake holder 28 has a defined orientation with respect to second holding profile 35. Therefore, the alignment of pins 38 as well as the course of channels 40 have to be selected according to the desired orientation of the casing brake holder 28 at each point along the moving path 43.

In the following, the process for removing casing brake 24 from filling tube 12 is described in detail:

It is noted that due to the restricted guidance of casing brake 24 by first holding device 30, second holding device 34 and casing brake holder 28, the position and orientation of casing brake 24 with respect to filling tube 12 is dependent on the pivoting degree of filling tube 12 about pivot axis 49. Preferably, all forces for moving casing brake 24 are transmitted by first holding device 30, wherein second holding device 34 solely provides a counteracting force, dependent on the force transmitted by first holding device 30. First holding device 30 is pivoted together with filling tube 12 around the same pivot axis 49 thereby forcing casing brake 24 with casing brake holder 28 along second holding device 34. The channels 40 of second holding device 34 and pins 38 of casing brake holder 28 are arranged in a way that casing brake holder 28 with casing brake 24 is always oriented and located with respect to filling tube 12 in a predetermined and desired manner.

Figure 3:
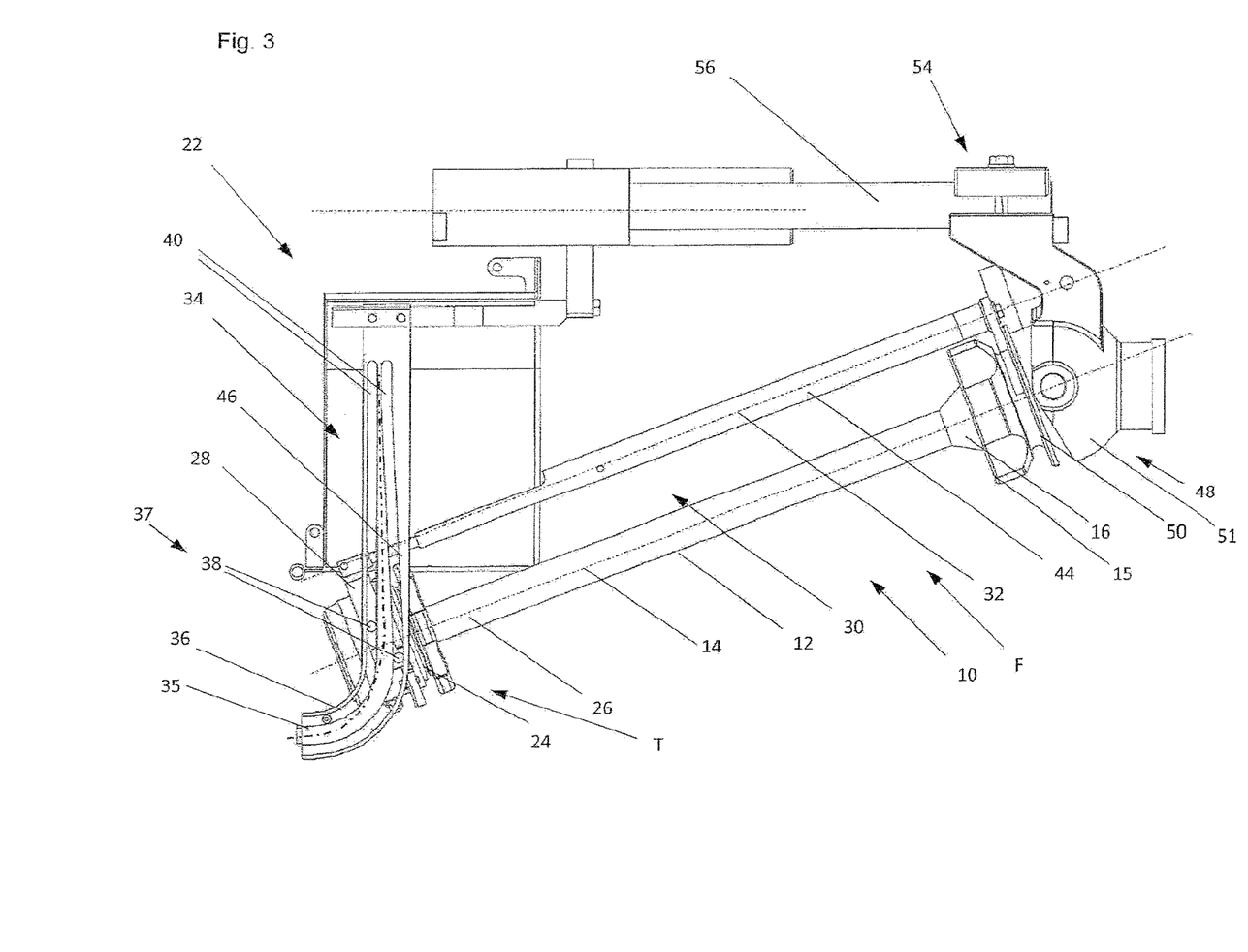
FIG. 3 is a cross-sectional top view of the filling tube assembly of FIG. 1 and FIG. 2 approximately centrally through the upper holding profile, wherein the filling tube is in a position between the production position and the interchanging position and the casing brake is in a position between the braking position and the releasing position.

According to FIG. 1 and FIG. 2, filling tube 12 is in production position P and casing brake 24 is arranged on filling tube 12 in braking position B. In FIG. 3, filling tube 12 is pivoted away from production position P in direction of interchanging position I (shown in FIGS. 4, 5) to a flapping or intermediate position F. Between production position P and flapping position F of filling tube 12, casing brake 24 is linearly moved along filling tube axis 14 between braking position B and a turning position T so that casing brake 24 is at least approximately in the turning position T when filling tube 12 is at least approximately in the flapping position F, vice versa. This further means that brake axis 26 remains coaxial with filling tube axis 14. To make sure that filling tube axis 14 and brake axis 26 remain coaxial, guiding means 36 and engaging means 37 or rather channel 40 and pin 38 respectively have to be configured in a way that casing brake 24 performs the same pivoting action around pivot axis 49 as filling tube 12.

In turning position T, casing brake 24 is arranged in the proximity of filling outlet 18, which could be still on or off filling tube 12. In case casing brake 24 is still on filling tube 12, casing brake 24 should be close enough to filling outlet 18 for enabling a pivoting action of casing brake 24 with respect to filling tube 12. It is preferred that, in turning position T, casing brake 24 is just off filling tube 12 in order to avoid damages to brake lips of brake body 24.

As soon as filling tube 12 is further pivoted from flapping position F in direction of interchanging position I, casing brake 24 is starting a pivoting action away from filling tube 12 in the opposite direction of rotation than the pivoting action of filling tube 12. During this pivoting action of casing brake 24 relative to filling tube 12, no further translational movement of casing brake 24 relative to filling tube 12 is necessary. However, according to the invention, guiding means 36 and engaging means 37 can be configured in a way that the translational movement of casing brake 24 relative to filling tube 12 can continue during the pivoting action of casing brake 24.

Figure 4:
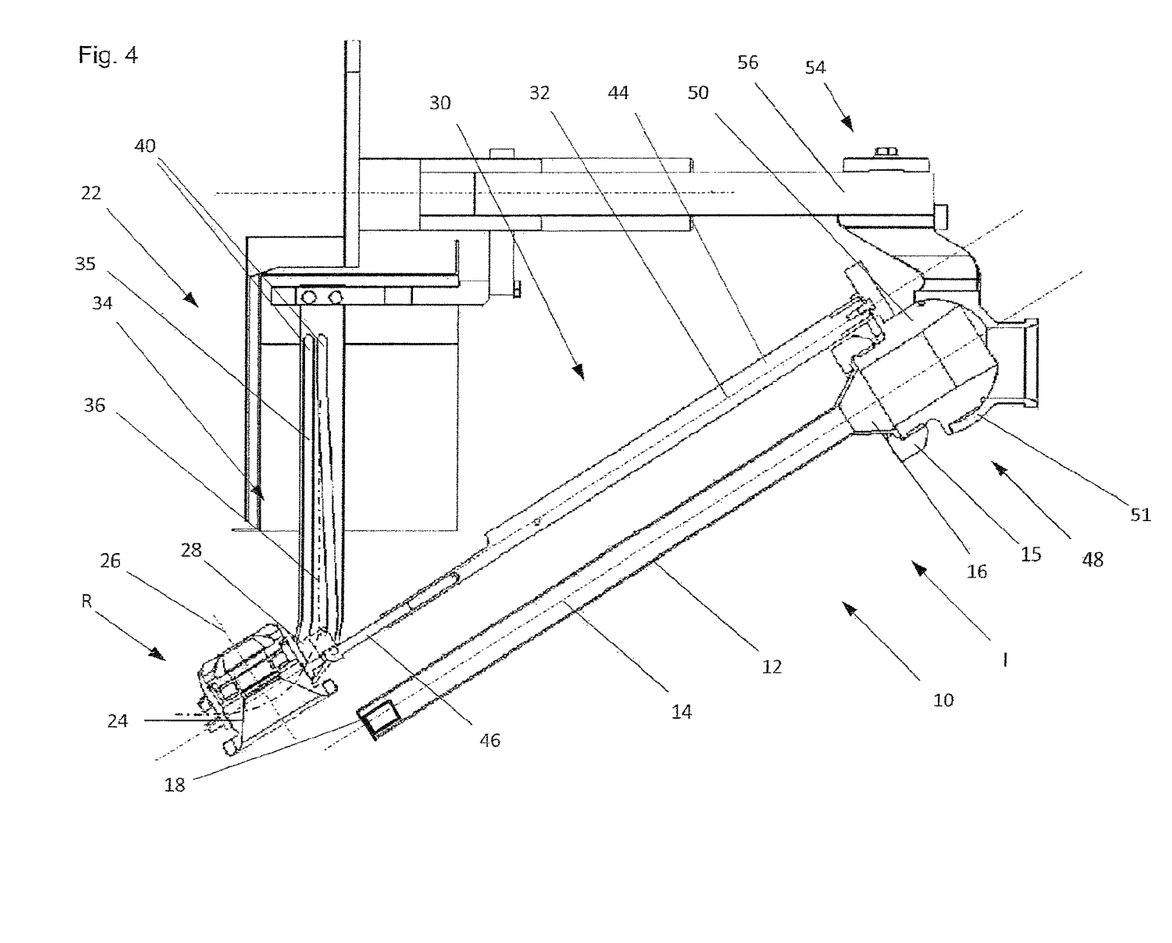
FIG. 4 is a cross-sectional top view of the filling tube assembly of FIG. 1 to FIG. 3 through the central axis of the filling tube, wherein the filling tube is in the interchanging position and the casing brake is in the releasing position.
Figure 5:
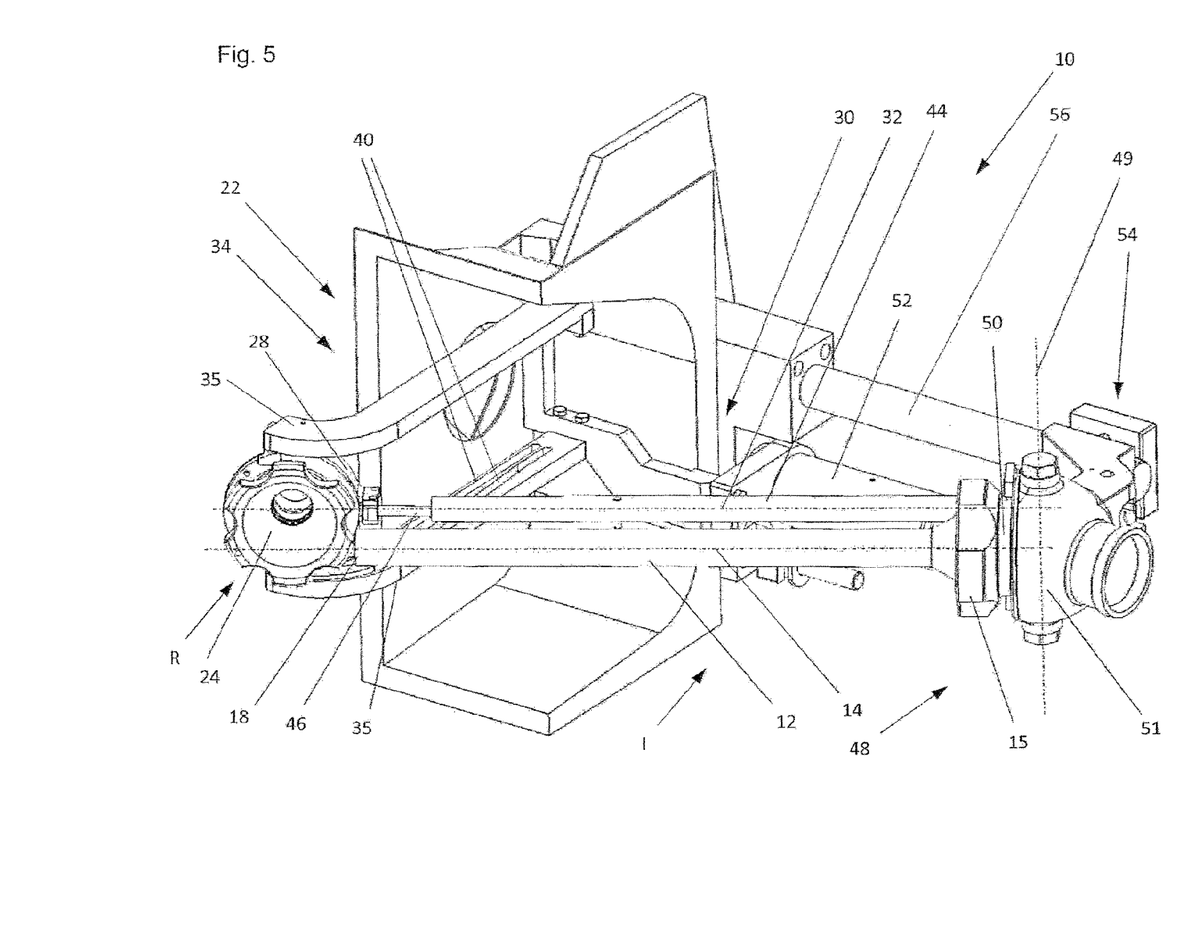
FIG. 5 is a perspective view of the filling tube assembly of FIG. 1 to FIG. 4, wherein the filling tube is in the interchanging position and the casing brake is in the releasing position.

The end of the removal process is shown in FIG. 4 and FIG. 5 from different perspectives. Filling tube 12 is in interchanging position I and casing brake is in releasing position R, pivoted away from filling tube axis 14. In this position, a new supply of packaging casing can be loaded onto filling tube 12 from its free end. Moreover, filling tube 12 and/or casing brake 24 can be replaced easily. For replacing casing brake 24, the screw fixing casing brake 24 in casing brake holder 28 is loosened and casing brake 24 is removed from holder 28 which remains at the clipping machine.

The assembly process of casing brake 24 is running vice versa the removal process. During the assembly process, filling tube 12 is pivoted from Interchanging position I via flapping position F to production position P and casing brake 24 is forced respectively from releasing position R via turning position T to braking position B. Since casing brake 24 is restricted guided, no manual adjusting procedure has to be performed for mounting casing brake 24 onto filling tube 12. Consequently, by pivoting filling tube 12 from interchanging position I to production position P, casing brake 24 is mounted onto filling tube 12 automatically.

LIST OF REFERENCE SIGNS 10 filling tube assembly
12 filling tube
14 filling tube axis 15 cap nut
16 filling inlet
18 filling outlet
20 clipping device
22 casing brake unit
24 casing brake
26 brake axis
28 casing brake holder
30 first holding device
32 first holding axis
34 second holding device
35 second holding profile
36 guiding means
37 engaging means
38 pin
40 channel
42 side-wall
43 moving path
44 first elongate beam
45 first beam axis
46 second elongate beam
47 second beam axis
48 fixation unit
49 pivot axis
50 calotte-shaped adapter
51 calotte holder
52 drive unit
54 mounting unit
56 mounting tube
B braking position
F flapping position
FD feeding direction
I interchanging position
P production position
R releasing position
T turning position

The invention claimed is:

1. A filling tube assembly for being mounted to a clipping machine for producing sausage-shaped products, like sausages, the filling tube assembly comprising:
  a mounting unit for mounting the filling tube assembly to the clipping machine;
  a filling tube for feeding flowable filling material in a feeding direction into a tubular or bag-shaped packaging casing being consumably arranged on the filling tube, wherein the filling tube has a filling inlet for receiving the filling material, a filling outlet for discharging the filling material into the packaging casing and a filling tube axis extending between the filling inlet and the filling outlet, and wherein the filling tube is pivotable relative to the mounting unit around a pivot axis at least between a production position and an interchanging position; and
  a casing brake unit with a brake axis, a casing brake holder and a casing brake for being reversibly coupled to the casing brake holder, wherein the casing brake holder is configured for reversibly holding the casing brake on the filling tube in a braking position, in which the brake axis is at least basically coaxial with the filling tube axis, wherein the casing brake holder together with the casing brake is moveable between the braking position and a releasing position by a pivoting and translational action, and wherein, in the releasing position, the casing brake holder together with the casing brake is pivoted away from the filling tube in a way that packaging casing to be filled can be loaded onto the filling tube;
  wherein the casing brake unit further comprises:
  a first holding device with a first holding axis, the first holding device is coupled to the filling tube in a way that a pivoting action of the filling tube around the pivot axis causes the same pivoting action of the first holding device around the pivot axis, wherein the casing brake holder is pivotably arrangeable at the first holding device for pivoting relatively to the first holding device at least in a section between the braking position and the releasing position, and wherein the casing brake holder is movable along the first holding axis;
  a second holding device for guiding the casing brake holder with the casing brake along at least two guiding means, wherein the casing brake holder and/or the casing brake comprise at least one corresponding engaging means for each guiding means for engaging with a respective guiding means, wherein the guiding means are configured for causing a translational movement of the casing brake relative to the filling tube when moved between the braking position and a turning position and for causing a pivoting action of the casing brake relative to the filling tube when moved between the turning position and the release position, when the filling tube is pivoted between the production position and the interchanging position.

2. The filling tube assembly according to claim 1, wherein the guiding means is configured such that during the movement of the filling tube from the production position to the interchanging position, the casing brake is forced from the braking position to the releasing position, wherein the casing brake is first being moved axially along the filling tube axis towards the filling outlet and subsequently being pivoted away from the filling tube axis.

3. The filling tube assembly according to claim 2, wherein the guiding means comprise at least a rail and/or a channel with side-walls, wherein the engaging means comprise at least a protruding member for protruding inside the channel and engaging with at least one side-wall of the channel and/or at least a crab for engaging with the rail.

4. The filling tube assembly according to claim 3, wherein at least in one segment of the moving path, the guiding means are diverging or converging with respect to a pivoting direction of the filling tube.

5. The filling tube assembly according to claim 4, wherein the first holding device comprises at least a first elongate beam with a first beam axis and a second elongate beam with a second beam axis extending along the first holding axis and being engaged with each other, wherein the first elongate beam and the second elongate beam are configured for being mutually shifted along the first holding axis.

6. The filling tube assembly according to claim 5, wherein that either at least a part of the first elongate beam is encompassed by at least a part of the second elongate beam or at least a part of the second elongate beam is encompassed by at least a part of the first elongate beam.

7. The filling tube assembly according to claim 6, wherein the first elongate beam is fixed to the filling tube, and the casing brake holder is pivotably fixed to the second elongate beam.

8. The filling tube assembly according to claim 7, wherein the filling tube is fixedly and reversibly mounted to an adapter part of a fixation unit, wherein the first holding device is fixedly mounted to the adapter part of the fixation unit as well, wherein the adapter part is pivotably arranged at a guiding part of the fixation unit for enabling the pivoting action of the filling tube and the casing brake unit relatively to the mounting unit of the filling tube assembly around the pivot axis.

9. The filling tube assembly according to claim 8, wherein the second holding device is reversibly linearly moveable relative to the mounting unit on by a drive unit in the feeding direction.

10. The filling tube assembly according to claim 1, wherein the guiding means comprise at least a rail and/or a channel with side-walls, wherein the engaging means comprise at least a protruding member for protruding inside the channel and engaging with at least one sidewall of the channel and/or at least a crab for engaging with the rail.

11. The filling tube assembly claim 1, wherein at least in one segment of the moving path, the guiding means are diverging or converging with respect to a pivoting direction of the filling tube.

12. The filling tube assembly according to claim 1, wherein the first holding device comprises at least a first elongate beam with a first beam axis and a second elongate beam with a second beam axis extending along the first holding axis and being engaged with each other, wherein the first elongate beam and the second elongate beam are configured for being mutually shifted along the first holding axis.

13. The filling tube assembly according to claim 12, wherein that either at least a part of the first elongate beam is encompassed by at least a part of the second elongate beam or at least a part of the second elongate beam is encompassed by at least a part of the first elongate beam.

14. The filling tube assembly according to claim 12, wherein the first elongate beam is fixed to the filling tube, and the casing brake holder is pivotably fixed to the second elongate beam.

15. The filling tube assembly according to claim 1, wherein the filling tube is fixedly and reversibly mounted to an adapter part of a fixation unit, wherein the first holding device is fixedly mounted to the adapter part of the fixation unit as well, wherein the adapter part is pivotably arranged at a guiding part of the fixation unit for enabling the pivoting action of the filling tube and the casing brake unit relatively to the mounting unit of the filling tube assembly around the pivot axis.

16. The filling tube assembly according to claim 15, wherein the adapter part comprises a calotte-shaped adapter and the guiding part comprises a calotte holder, wherein at least a part of the calotte-shaped adapter pivotably arranged inside the calotte holder and the calotte holder is fixed to or an integral part of the mounting unit.

17. The filling tube assembly according to claim 1, wherein the second holding device is reversibly linearly moveable relative to the mounting unit on by a drive unit in the feeding direction.

18. The filling tube assembly according to claim 17, wherein the linear moving action of the second holding device is actuated by a drive means.

19. The filling tube assembly according to claim 18, wherein the drive means comprises a cylinder piston.

20. The filling tube assembly according to claim 18, wherein the second holding device comprises at least four guiding means, wherein each guiding means is facing opposite a corresponding guiding means for providing the same guidance for the casing brake, wherein the casing brake is arranged in between two pairs of corresponding guiding means.

21. The filling tube assembly according to claim 1, wherein the pivoting action of the filling tube is actuated by a drive means.

22. The filling tube assembly according to claim 21, wherein the drive means comprises a cylinder piston.

23. The filling tube assembly according to claim 1, wherein the second holding device comprises at least four guiding means, wherein each guiding means is facing opposite a corresponding guiding means for providing the same guidance for the casing brake, wherein the casing brake is arranged in between two pairs of corresponding guiding means.

24. A clipping machine for producing sausage-shaped products, like sausages, by feeding flowable filling material, in a filling process, into a tubular or bag-shaped packaging casing in a feeding direction,
comprising a filling tube assembly according to claim 1.

* * * * *